United States Patent [19]
Leriche et al.

[11] Patent Number: 6,045,918
[45] Date of Patent: Apr. 4, 2000

[54] METHOD FOR ATTACHING A POLYURETHANE SURFACE TO A POLYVINYL CHLORIDE SURFACE

[75] Inventors: Christian Gustave Alain Leriche, Trets; Joel Alain Jerome Turin, Marseilles, both of France

[73] Assignee: Gemplus S.C.A., Gemenos, France

[21] Appl. No.: 09/043,524

[22] PCT Filed: Sep. 20, 1996

[86] PCT No.: PCT/FR96/01476

§ 371 Date: May 18, 1998

§ 102(e) Date: May 18, 1998

[87] PCT Pub. No.: WO97/11137

PCT Pub. Date: Mar. 27, 1997

[30] Foreign Application Priority Data

Sep. 20, 1995 [FR] France ................... 95/11055

[51] Int. Cl.[7] .............. B32B 27/00; B32B 27/40
[52] U.S. Cl. ............ 428/423.1; 428/195; 156/60; 156/331.7; 427/412.1; 427/412.4; 427/369
[58] Field of Search ................ 428/423.1, 195; 156/60, 331.7; 427/412.1, 412.4, 369

[56] References Cited

U.S. PATENT DOCUMENTS

| 4,373,081 | 2/1983 | Nachtkamp et al. | 528/45 |
|---|---|---|---|
| 4,424,834 | 1/1984 | Sumi et al. | 138/121 |
| 4,436,784 | 3/1984 | Ehrhart | 428/423.1 |
| 5,356,717 | 10/1994 | Choki et al. | 428/425.9 |

FOREIGN PATENT DOCUMENTS

| 05448933 | of 1993 | European Pat. Off. . |
| 2513568 | of 1983 | France . |
| 1601033 | of 1981 | United Kingdom . |

*Primary Examiner*—William Krynski
*Assistant Examiner*—B. Shewareged
*Attorney, Agent, or Firm*—Roland Plottel

[57] ABSTRACT

Method for attaching a polyurethane (PU) surface to a polyvinyl chloride or other polymer surface, particularly useful for making smart cards. A plasticizer compatible with both the PU and the polymer is placed between the surface of the polymer and the surface of a bicomponent PU precursor resin, and pressure is applied to incorporate the plasticizer in the polymer surface and in the polyurethane as it forms.

16 Claims, No Drawings

METHOD FOR ATTACHING A POLYURETHANE SURFACE TO A POLYVINYL CHLORIDE SURFACE

The invention relates to a method for attaching a bicomponent polyurethane surface to a polyvinyl chloride surface. This method applies to the domain of bonding two polymers, particularly bonding polyurethane (PU) to polyvinyl chloride (PVC), particularly for making smart cards with and/or without projecting contacts.

Current methods of bonding polyurethane (PU) to a polyvinyl chloride (PVC) surface require a preliminary surface treatment step. This step modifies the surface state of the PVC, i.e. it modifies surface tensions, in order to obtain a satisfactory bond between the two polymers.

Surface treatment of this type is effected either with a degreaser such as methyl ethyl ketone (MEK) or acetone for example, or by flame treatment, or by plasma treatment, or finally by corona treatment. All these various treatments create free radicals at the PVC surface. These free radicals, are reactive to species that are capable of radical polymerization, hence principally to compounds with double bonds. However they are not reactive to compounds polymerizable by polycondensation. Now, polyurethanes are obtained by polycondensation. As a result, when a PVC surface is bonded to a PU surface after pretreatment in order to create free radicals at the PVC surface, the bond is of poor quality and is hence difficult to reproduce.

Moreover, such surface treatments pose many safety, implementation, and cost problems. This is because the products used are often toxic, and implementation of this preliminary step is tedious and time-consuming. Also, this cumbersome step entails high manufacturing cost.

The present invention overcomes all these disadvantages because it offers a method for bonding a bicomponent polyurethane surface to a polyvinyl chloride surface consisting of placing a resin comprising the two components necessary for polyurethane formation on a PVC surface, followed by a pressing step without prior surface treatment. For this purpose, one characteristic of the method according to the invention consists of incorporating a plasticizer into the polyurethane as it forms, during pressing.

According to another characteristic of the invention, the plasticizer is chosen from plasticizers that are compatible both with polyvinyl chloride (PVC) and with polyurethane (PU).

According to another characteristic of the invention, the plasticizer is incorporated into the polyurethane as it forms in proportions between 2 and 12 wt. %, preferably between 3 and 8 wt. %.

The method according to the invention overcomes all the disadvantages involved in the preliminary surface treatment step. Hence, safety of the operators is ensured since it is no longer necessary to use a hazardous product. Moreover, the time and the cost of implementation are considerably reduced. Finally, the bond between the PVC and PU is of better quality than that obtained by prior techniques and offers good reproducibility. The method according to the invention thus facilitates industrial implementation of bonding PU to PVC.

Plasticizers are generally used to improve the flexibility of a polymer. However, they have thus far never been used in adhesive formulations to improve bonding between two polymers. This is because plasticizers of the phthalate type for example, whose alkyl groups generally have between 4 and 11 carbons, namely plasticizers of the dibutyl phthalate, dioctyl phthalate, or diisoundecanoic phthalate type, are used to modify the physical properties of the polyurethane, namely to modify its flexibility, physical appearance, and environmental stability. Plasticizers with two long-chain alkyl groups, namely with 7 to 11 carbons, are preferred because they migrate less in the PU and hence less volatile than the plasticizers with short-chain alkyl groups.

Other features and advantages will emerge from reading the description, provided as an illustrative and non-limiting example.

One embodiment of the method according to the present invention consists of incorporating a plasticizer into one of these polymers when the PVC and PU surfaces are pressed together. The reasons for this incorporation and the way in which it is accomplished are explained below.

Compatibility between polyvinyl chloride and any polyurethane is generally very low. This is due to the fact that, contrary to the initial polyol in the PU composition, which is slightly compatible with PVC, the isocyanate, namely the PU hardening agent, is totally incompatible with PVC. Moreover, as explained above, radical reactions between the PVC surface and the PU, which is a material polymerizable by polycondensation, cannot be contemplated. For all these reasons, a good bond between the PVC and the PU is very difficult to achieve.

Hence a means had to be found for, in particular, increasing compatibility between the two polymers, namely between the PVC and the PU, to improve the quality and reproducibility of their bond.

Surprisingly it has been found that a plasticizer which is compatible with both PVC and PU, can lead to the desired result.

Since the plasticizer is compatible with both polymers, it penetrates into their structure and brings with it molecules of each of the two polymers. In this way, the two polymers, PVC and PU, interpenetrate, creating intermolecular hydrogen and Van der Walls type bonds.

Thus, the plasticizer used plays the role of a solvent since, because of its viscosity and structure, it increases compatibility between the PVC and the PU at the time the two polymer surfaces are placed in contact.

Moreover, the plasticizer has an advantage over solvents generally used in known methods of the prior art such as methyl ethyl ketone for example. Namely, it makes two polymers compatible with each other without modifying their physical properties, while traditional solvents destroy the surface state of at least one polymer by solubilization.

Advantageously, the plasticizer used belongs to the phthalate family. The number of carbons in the alkyl groups of the phthalate considered has no perceptible influence on interpenetration of the polymers and hence bond quality. As a result, the plasticizer used is advantageously chosen from phthalates whose alkyl groups have 4 to 11 carbons, for example di-n octyl phthalate (DIOP).

According to one embodiment, it is also possible to choose the plasticizer from the aliphatic polyesters.

The bonding method according to the invention hence consists, in the first step, of successively placing, on a PVC surface, both a fine layer of plasticizer such as di-n octyl phthalate for example and a resin comprising the two components necessary for formation of the polyurethane network by polycondensation, namely a resin comprising a polyol and a diisocyanate. In the second step, the resin, the plasticizer, and the PVC are pressed for several minutes. The plasticizer then acts at the interface between the two polymer surfaces at the time the polyurethane network is created. When the PU is created, the plasticizer is incorporated therein and migrates simultaneously into the PVC structure, so that it entrains molecules of each of the two polymers so that they interpenetrate.

Advantageously, the plasticizer is incorporated into the polyurethane as it forms in proportions between 2 and 12 wt. %, preferably between 3 and 8 wt. %. When the plasticizer is incorporated in quantities that are too low, namely in quantities less than 2 wt. %, the effect of the plasticizer is virtually invisible and not significant enough for the bond to be of good quality. On the other hand, when the quantity of plasticizer is too high, namely greater than 12 wt. %, the interactions between the reagents are more difficult to create while, all other conditions being equal, the kinetics remain identical. Moreover, the excess plasticizer is rejected toward the outside of the interface between the two polymer surfaces so that it adversely affects bond quality between the PVC and the PU and hence the quality of the product obtained by the bonding process according to the invention.

The method according to the invention hence eliminates the preliminary surface treatment step and hence the use of hazardous products. This considerably reduces the time and cost of implementing the method.

The method according to the invention can of course be broadened to the bonding of any type of polymer. For this purpose, one need only choose a specific plasticizer that is compatible with the two polymers to be bonded, to increase their compatibility. Thus, for example, PVC can be replaced by any other polymer able to create hydrogen bonds with the PU, such as ABS (acrylonitrile-butadiene-styrene), or PC (polycarbonate).

In summary, it can be seen that the method of the invention achieves compatibilization of several elements, in particular: the components of the polyurethane, the polymer substrate, the plasticizer such as DIOP, and also the surface moisture of the substrate. This compatibilization creates a semi-interpenetrated network zone at the interface and eliminates the water present at the substrate surface by converting it into an element compatible with the other interface elements, while it would be insoluble in the substrate.

The importance of using the plasticizer at the surface, preferably in the pure state, such as DIOP, rather than in the substrate or in an adhesive, is in particular the fact that water is solubilized in the DIOP, the water being present in a quantity conforming to a molecular layer and the DIOP, in a larger quantity.

In the case where DIOP is introduced into the adhesive and/or the substrate, a slight improvement in bondability would be found, but it would have to be introduced in a large quantity, which would damage the properties of one or the other. Better results are obtained in the method of the invention described above.

Of course, the goal of the invention is to protect any structure, particularly a smart card structure, comprising a polyurethane network, for example a layer, adhering to at least one surface of a polymer such as the surface of a sheet, said network and said bond being obtained according to the method described above.

What is claimed is:

1. Method for attaching a polyurethane surface to a polymer surface that is able to create bonds to the polyurethane, comprising the steps of placing a thin layer of a plasticizer between the surface of the polymer and the surface of a resin comprising a polyol and diisocyanate necessary for formation of the polyurethane and applying pressure so as to incorporate the plasticizer in the polymer surface and in the polyurethane as it forms.

2. Method according to claim 1, wherein the plasticizer is compatible with both the polymer and the polyurethane.

3. Method according to claim 1, wherein the polymer is selected from the group consisting of a polyvinyl chloride (PVC), an acrylonitrile-butadiene-styrene (ABS), and a polycarbonate (PC).

4. Method according to claim 3, wherein the plasticizer belongs to the phthalate family.

5. Method according to claim 4, wherein the plasticizer is chosen from the phthalates whose alkyl groups contain four to eleven carbons.

6. Method according to claim 4, wherein the plasticizer is di-n-octyl phthalate.

7. Method according to claim 1 wherein the plasticizer is chosen from among the aliphatic polyesters.

8. Method according to any one of the foregoing claims 1, 2 or 7, wherein the plasticizer is incorporated into the polyurethane in proportions between 2 and 12 wt. %.

9. Card structure containing a polyurethane network bonded to at least one sheet of polymer that is able to create bonds to the polyurethane, wherein said network and the bond are obtained according to the method according to claim 1.

10. Method according to claim 2, wherein the plasticizer penetrates both the polyurethane and the polymer.

11. Method according to claim 3, wherein the polymer is a polyvinyl chloride (PVC).

12. Method for attaching a polyurethane surface to a polymer surface that is able to create bonds to the polyurethane, comprising the steps of placing a thin layer of a plasticizer between the surface of the polymer and the surface of a resin comprising a polyol and a diisocyanate necessary for formation of the polyurethane and applying pressure under conditions so as to incorporate the plasticizer in the polymer surface and in the polyurethane network as it forms.

13. Card structure comprising a sheet of polyurethane, a sheet of a polymer that is able to create bonds to the polyurethane, and between the sheets a thin layer of a plasticizer compatible with both the polymer and the polyurethane, having a polyurethane network formed in sites between the sheets and wherein the plasticizer penetrates both the polyurethane and the polymer.

14. Card structure according to claim 13, wherein the polymer is a polyvinyl chloride (PVC).

15. Card structure according to claim 14, where the plasticizer belongs to the phthalate family.

16. Card structure according to claim 13, wherein the card structure is a smart card.

* * * * *